United States Patent Office 3,198,790
Patented Aug. 3, 1965

3,198,790
STEROIDAL DIPYRIMIDINES
Pietro de Ruggieri, Carmelo Gandolfi, and Umberto Guzzi, Milan, Italy, assignors to Ormonoterapia Richter S.p.A., Milan, Italy, a corporation of Italy
No Drawing. Filed May 10, 1963, Ser. No. 279,626
Claims priority, application Italy, May 12, 1962,
9,514/62
12 Claims. (Cl. 260—239.5)

This invention relates to dipyrimidines incorporated into the androstane and estrane ring in the positions 3,2-d and 17,16-d, represented by the general formula:

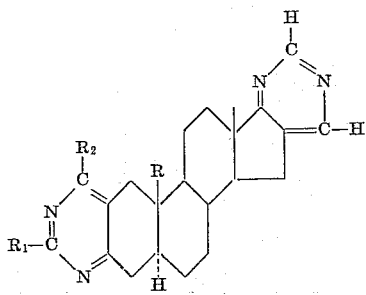

wherein R is a member selected from the group consisting of hydrogen and methyl, while $R_1$ and $R_2$ are members selected from the group consisting of hydrogen and amino, and intermediates employed in their preparation. These compounds are very useful in therapeutics as anti-androgenic agents. These substances may be prepared by reacting such compounds as guanidine, formamidine, tris-formyl-amino-methane and dicyandiamide with $\beta$-dicarbonyl-derivatives, the reaction being carried out first in position 2,3 and then in position 16,17 or vice versa, or even in positions 2,3 and 16,17 simultaneously.

The following examples are offered for illustrative purposes only, no limitation of the scope of the invention being intended.

EXAMPLE NO. 1

$5\alpha$-androstane-[3,2-d]-[17,16-d]-dipyrimidine 2.5 parts of 2,16-diformyl-5α-androstane-3,17-dione (copending U.S. application Serial No. 150,664, filed November 7, 1961), dissolved in 50 parts of formamide were mixed with 3.5 parts of tris-formyl-amino-methane and 0.15 part of p-toluenesulphonic acid. After the mixture was kept at 160° C. for 8 hours, it was poured into 300 parts of normal sodium hydroxide and extracted with chloroform. The chloroform extract was washed with water until neutral, and concentrated and the recovered product was recrystallized from acetone. Yield: 1.27 parts of 5α-androstane-[3,2-d]-[17,16-d]-dipyrimidine; M.P. 217–219° C.; $[\alpha]_D = +90°$ (benzyl alcohol).

EXAMPLE NO. 2

$5\alpha$-estrane-[3,2-d]-[17,16-d]-dipyrimidine 1.3 parts of 2,16-diformyl-5α-estrane-3,17-dione (application Serial No. 150,664) were dissolved in 52 parts of formamide, and the solution was mixed with 5.2 parts of tris-formyl-amino-methane and 0.078 part of p-toluene sulphonic acid. The mixture was kept at 160° C. for 7 hours, and then poured into 200 parts of 1 N sodium hydroxide and extracted with chloroform. The chloroform extract was washed with water until neutral and evaporated to dryness, and the recovered product was recrystallized from acetone. Yield: 0.62 part of 5α-estrane-[3,2 - d] - [17,16-d] - dipyrimidine; M.P. 212–215° C.; $[\alpha]_D = +122°$ (pyridine).

EXAMPLE NO. 3

[3,2-d]-2'-amino-pyrimidine-5α-androstane-[17,16-d]-pyrimidine

A solution of 2 parts of 2-formyl-5α-androstane-3-one-[17,16-d]-pyrimidine (copending application Serial No. 215,243, filed August 6, 1962, now Patent No. 3,114,749) in 10 parts of ethanol was mixed with 10 parts of a solution of guanidine acetate in ethanol. The mixture was refluxed for 6 hours and then concentrated, and the product, collected by filtration, was recrystallized from methylene chloride-methanol. Yield: 1.2 parts of [3,2-d]-2'-amino-pyrimidine-5α-androstane-[17,16-d]-pyrimidine; M.P. >300° C.;

U.V.: $\lambda_{max}$. 227, 255 and 313 m$\mu$; $\epsilon = 16{,}300, 5{,}630, 5{,}140$

EXAMPLE NO. 4

$5\alpha$-estrane-17-one-[3,2-d]-2'-amino-pyrimidine

Three parts of 5α-estrane-17β-ol-[3,2-d]-2'-amino-pyrimidine were dissolved in 5 parts of acetone and 65 parts of dimethylformamide, and were oxidized at 0° C. with 6 parts of Jones' reagent. At the end of ten minutes the excess oxidizer was decomposed with isopropyl alcohol, the mixture was neutralized, ⅔ of the solvent were distilled off under vacuum, and the residue was fully diluted with water. Yield: 2.2 parts of 5α-estrane-17-one-[3,2-d]-2'-amino-pyrimidine; M.P. >290° C.; I.R.: 1740, 1642, 1587, 1545 cm.$^{-1}$

EXAMPLE NO. 5

16-formyl-5α-estrane-17-one-[3,2-d]-2'-amino-pyrimidine

Two parts of sodium methylate and 4 parts of ethyl formate were added to a suspension of 2 parts of 5α-estrane-17-one-[3,2-d]-2'-amino-pyrimidine in 80 parts of benzene, in a nitrogen atmosphere. After the mixture was stirred for 8 hours at room temperature, it was neutralized with a monobasic sodium phosphate solution and extracted with ethyl acetate. The solvent was evaporated from the organic phase, to obtain 1.3 parts of 16-formyl-5α-estrane-17-one-[3,2-d] - 2' - amino-pyrimidine; M.P. >300° C.; ferric chloride test: positive.

EXAMPLE NO. 6

[17,16-d]-pyrimidine-5α-estrane-[3,2-d]-2'-amino-pyrimidine 1.27 parts of tris-formyl-amino-methane and 0.06 part of p-toluenesulfonic acid were added to a solution of 0.95 part of 16-formyl-5α-estrane - 17 - one-[3,2-d]-2'-amino-pyrimidine in 50 parts of formamide. The mixture was kept at 160° C. for 8 hours, and then poured into 200 parts of normal sodium hydroxide and extracted with ethyl acetate; the extract was washed with water until neutral and concentrated until it crystallized. Yield: 0.27 part of [17,16-d]-pyrimidine-5α-estrane-[3,2-d]-2'-amino-pyrimidine; M.P. >290° C.;

U.V.: $\lambda_{max}$. 228, 255, 312 m$\mu$; $\epsilon = 16{,}050, 5{,}570, 5{,}130$ (methanol)

EXAMPLE NO. 7

$2\alpha$-cyano-5α-androstane-3,17-dione 2.5 parts of 2α-cyano-5α-androstane-17β-ol-3-one dissolved in 150 parts of acetone were oxidized with 6 parts of Jones' reagent. At the end of ten minutes, the excess oxidizer was decomposed with isopropyl alcohol, the mixture concentrated under vacuum and diluted with water, and the product collected by filtration and recrystallized from methanol. Yield: 2.2 parts of 2α-cyano-5α-androstane-3,17-dione; M.P. 224–226° C.; $[\alpha]_D = +135°$ (chloroform).

EXAMPLE NO. 8

*2-cyano-3-acetoxy-5α-androst-2-ene-17-one*

2.2 parts of 2α-cyano-5α-androstane-3,17-dione were dissolved in 6 parts of pyridine and 3 parts of acetic anhydride, and the resulting solution was allowed to stand overnight at room temperature. It was then diluted with water, and the product was collected by filtration and recrystallized from methanol. Yield: 2.12 parts of 2-cyano-3-acetoxy-5α-androst-2-ene-17-one; M.P. 230–232° C.; I.R.: 2273, 1786, 1754, 1692 cm.$^{-1}$.

EXAMPLE NO. 9

*2α-cyano-16-formyl-5α-androstane-3,17-dione*

1.6 parts of sodium methylate and 3.2 parts of ethyl formate were added with stirring, under a stream of nitrogen, to a solution of 1.6 parts of 2-cyano-3-acetoxy-5α-androst-2-ene-17-one in 10 parts of tetrahydrofuran. After the mixture was kept at room temperature for 4 hours, it was diluted with 5 parts of ethanol and 3 parts of water, refluxed for 20 minutes, acidified, and diluted with water. The resulting product was collected by filtration and recrystallized from methanol. Yield: 1.43 parts of 2α-cyano-16-formyl-5α-androstane-3,17-dione; M.P. 243–247° C.; $[\alpha]_D = +84°$ (pyridine).

EXAMPLE NO. 10

*[3,2-d]-6'-amino-pyrimidine-5α-androstane-[17,16-d]-pyrimidine*

Three parts of tris-formyl-amino-methane and 0.13 part of p-toluenesulphonic acid were added to a solution of 1.1 parts of 2α-cyano-16-formyl-5α-androstane-3,17-dione in 60 parts of formamide. After the mixture was kept at 160° C. for 8 hours, it was poured into 250 parts of 1 N sodium hydroxide and extracted with ethyl acetate. The extract was washed with water until neutral and evaporated to dryness. By chromatography on alumina, from the ethyl acetate fractions, 0.2 part of 2α-cyano-5α-androstane-3-one-[17,16-d]-pyrimidine was recovered; M.P. >290° C.; I.R.: 2198, 1695, 1623, 1563 cm.$^{-1}$. From the ethyl acetate-acetone (3:2) fractions 0.31 part of [3,2-d]-6'-amino-pyrimidine-5α-androstane-[17,16-d]-pyrimidine was recovered; M.P. >290° C. $[\alpha]_D = +93°$ (benzyl alcohol); I.R.: 1640, 1586, 1560 cm.$^{-1}$.

EXAMPLE NO. 11

*[3,2-d]-2'6'-diamino-pyrimidine-5α-androstane-[17,16-d]-pyrimidine*

1.2 parts of dicyandiamide and 0.13 part of p-toluenesulphonic acid were added to a solution of 2.2 parts of 5α-androstane-3-one-[17,16-d]-pyrimidine (our patent application No. 215,243, U.S.A., filed August 6, 1962), in 60 parts of formamide. After the mixture was kept at 160° C. for 20 hours, it was poured into 200 parts of 1 N sodium hydroxide, extracted with ethyl acetate, washed with water until neutral, and evaporated to dryness. By chromatography on alumina, from the ethyl acetate-acetone (9:1) fractions, 0.46 part of [3,2-d]-2',6'-diamino-pyrimidine-5α-androstane-[17,16-d]-pyrimidine was recovered; M.P. >300° C.; $[\alpha]_D = +93°$ (benzyl alcohol).

What we claim is:

1. Compounds of the formula:

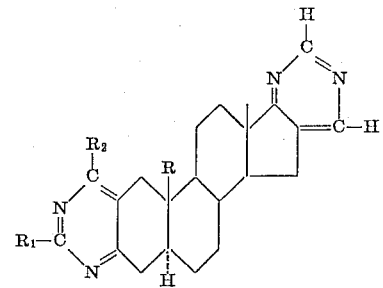

wherein R is a member selected from the group consisting of hydrogen and methyl, and $R_1$ and $R_2$ are members selected from the group consisting of hydrogen and amino.

2. 5α-androstane-[3,2-d]-[17,16-d]-dipyrimidine.
3. 5α-estrane-[3,2-d]-[17,16-d]-dipyrimidine.
4. [3,2-d]-2'-amino-pyrimidine-5α-androstane-[17,16-d]-pyrimidine.
5. 5α-estrane-17-one-[3,2-d]-2'-amino-pyrimidine.
6. 16-formyl-5α-estrane-17-one-[3,2-d]-2'-amino-pyrimidine.
7. [3,2-d]-2'-amino-pyrimidine-5α-estrane-[17,16-d]-pyrimidine.
8. 2-cyano-3-acetoxy-5α-androst-2-ene-17-one.
9. 2α-cyano-16-formyl-5α-androstane-3,17-dione.
10. [3,2-d]-6'-amino-pyrimidine-5α-androstane-[17,16-d]pyrimidine.
11. 2α-cyano-5α-androstane-3-one-[17,16-d]-pyrimidine.
12. [3,2-d]-2',6'-diamino-pyrimidine-5α-androstane-[17,16-d]-pyrimidine.

References Cited by the Examiner

UNITED STATES PATENTS 2,999,092  9/61  Colton et al. _____ 260—239.5

FOREIGN PATENTS 1,310,522  10/62  France.

LEWIS GOTTS, *Primary Examiner.*